3,052,633
METHOD OF LUBRICATING WITH A RADIATION-RESISTANT UREIDO COMPOUND THICKENED LUBRICATING OIL

Thornton P. Traise, Chicago Heights, Ill., and Richard H. Leet, Hammond, Ind., assignors to Standard Oil Company, Chicago, Ill., a corporation of Indiana
No Drawing. Filed Dec. 2, 1959, Ser. No. 856,671
7 Claims. (Cl. 252—51.5)

This invention relates to radiation-resistant lubricant greases, and more particularly relates to greases containing a particular thickening agent which is characterized by exceptional stability under severe doses of radiation.

Machinery which is exposed to high energy ionizing radiation, as in master-slave manipulators, nuclear reactor control rod drives, atomic engine pumps and turbines, and nuclear propulsion engines, requires that lubricants employed therewith be stable under heavy dosages of radiation. Lubricant greases have presented a particularly troublesome problem; most thickening agents are very susceptible to radiation-induced decomposition, resulting in softening of the grease, inability to retain the base fluid (leakage) and, in extreme cases, loss of mechanical stability.

Where the ionizing radiation includes slow neutrons there arises the further problem of neutron activation, since thickener constituents such as sodium or lithium are converted to long-half-lived radioisotopes, thus making for disposal problems.

It is therefore a primary object of the present invention to provide a grease for applications requiring exceptional stability in the presence of high energy ionizing radiation. A further object is to provide a grease for use in the presence of slow neutrons, and which is essentially incapable of undergoing neutron activation. An additional object is to provide a grease which retains its properties in the presence of at least $10^4$R (roentgen) and even as much as $10^{10}$R, or more, of high energy ionizing radiation. Other and more particular objects will become apparent as the description of this invention proceeds.

According to the invention, lubrication of surfaces exposed to high energy ionizing radiation is effected by applying to said surfaces a lubricant base fluid thickened to grease consistency with a thickener comprising a ureido compound having the general formula

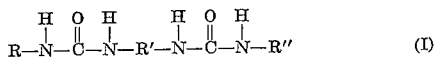

where R and R" are the same or different abietyl radicals selected from the group dehydroabietyl radical, dihydroabietyl radical, and tetrahydroabietyl radical and mixtures thereof, and R' is an alkylene radical or substituted alkylene radical of from 1 to about 30 carbon atoms or an arylene radical or a substituted arylene radical. The radicals R, R' and R" can contain substituents such as, for example, alkyl, alkoxy, cyano, aryl, hydroxy, carboxy, halogen, nitro and other substituent group. The alkylene radical can be straight and/or branched chain, and the arylene radicals can be mononuclear or polynuclear such as phenylene, biphenylene, naphthylene, anthrylene and phenanthrylene radicals. The terms "alkylene and arylene radicals" as used herein and in the appended claims includes substituted alkylene radicals and substituted arylene radicals.

These thickeners, their preparation, and their use in lubricant greases are described in application S.N. 750,050, by Robert J. Rosscup and Herbert J. Liehe, filed July 21, 1958.

The general structural formula of the abietyl radicals are:

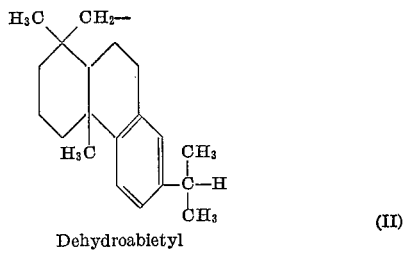

Dehydroabietyl (II)

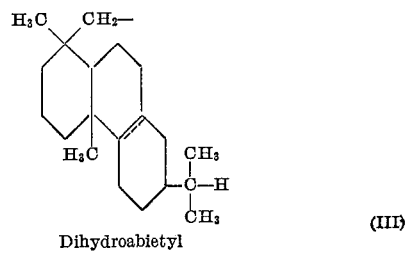

Dihydroabietyl (III)

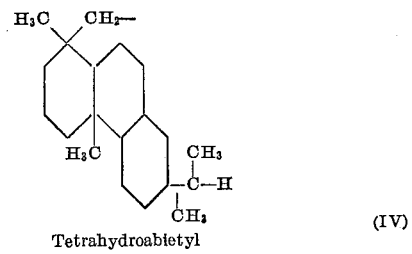

Tetrahydroabietyl (IV)

The ureido compound can be prepared by heating a mixture of an abietyl amine and a polyisocyanate in the equivalent weight ratio of 1:1, at a temperature within the range of room temperature (about 70° F.) to about 450° F.

Examples of abietyl amines, i.e. aliphatic amines attached to an alicyclic structure, which can be used in the preparation of the above described ureido compounds are dehydroabietyl amine, dihydroabietyl amine and tetrahydroabietyl amine or mixtures of such amines. A particularly well suited amine is a product marketed by Hercules Powder Company as "Rosin Amine D." This product is prepared by the catalytic hydrogenation of "Rosin Nitrile D" prepared by the action at elevated temperatures of ammonia on hydrogenated rosin. Distilled and undistilled grades are available as "Amine 750" and "Amine 751." The "Rosin Amine D" is a mixture of abietyl amines in the following approximate proportion:

| | "Rosin Amine D," percent |
|---|---|
| Dehydroabietyl amine | 60 |
| Dihydroabietyl amine | 30 |
| Tetrahydroabietyl amine | 10 |

Examples of suitable polyisocyanates are tolylene diisocyanate; p,p'-diisocyanate biphenyl; 1,4-diisocyanate-benzene; p,p'-diisocyanate-diphenylmethane; 1,6-diisocyanate-hexane; 1,12-diisocyanate-dodecane; 1,3,5-benzene-triisocyanate; naphthylene diisocyanate; bitolylene diisocyanate; tris-p-isocyanate-phenylmethane; etc.

The following is illustrative of the apparent reaction which takes place:

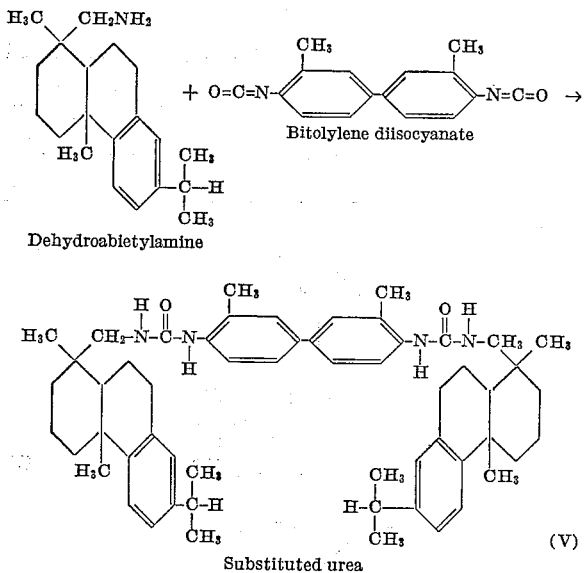

In addition to their radiation resistance, the ureido compounds above defined have been found to impart exceptional properties to grease compositions with respect to rheological properties, high thermal stability, high drop points and/or no-melt characteristics. Such grease compositions comprise a suitable normally liquid oleaginous lubricant vehicle containing from about 2% to about 25% by weight, of at least one ureido compound having the general Formula I, supra. The grease can be prepared by forming the ureido compound in situ in the oleaginous vehicle, or a concentrate of the ureido compound in an oleaginous vehicle can be preformed and the preformed thickener then mixed with the necessary amount of the lubricant vehicle to give a grease product containing the required concentration of the thickener.

In the in situ method of preparing the grease, the desired amount of the polyisocyanate is placed in a high temperature grease kettle, or other suitable heating equipment, containing a major proportion of the liquid lubricant vehicle to be used and the mixture heated to effect solution. To the heated solution is added the abietylamine in a ratio of roughly two moles of amine per mole of polyisocyanate and the balance of the oil, or a solution of the abietylamine in the balance of the liquid lubricant vehicle, and the mixture heated to a temperature of about 200° F. to 450° F. and maintained at said temperature until the product increases to the desired consistency. The temperature at which the mixture sets-up depends largely upon the nature of the liquid lubricant vehicle employed. When using a hydrocarbon oil such as a petroleum oil the mixture sets-up or reaches the desired consistency when the temperature reaches 350°–400° F., while when using a synthetic oil, such as a dialkyl ester of a dibasic carboxylic acid, such as di-isooctyl azelate, a dialkyl sebacate, etc., the desired consistency is obtained by heating to 220° F.–320° F. The grease product is then finished by cooling and colloid milling.

Oleaginous lubricant vehicles which can be thickened with the herein described ureido compounds to form greases of the present invention can be silicone polymer oils, mineral lubricating oils, synthetic hydrocarbon lubricating oils such as polybutenes or hydrogenated polybutenes, synthetic lubricating oils such as polyalkylene glycols and their derivatives, high molecular weight esters of dicarboxylic acid such as di-2-ethylhexyl adipate or o-phthalate, polyfluoro derivatives of organic compounds such as the trifluorovinyl chloride polymers known as "Fluorolube" (made by Hooker Chemical Company) and the trifluorochloroethylene polymers, known as "Kel-F-40" (made by the M. W. Kellogg Company), certain specialty lubricant fluids such as trimethylol propane pelargonate or pentaerythritol hexanoate, and other lubricant vehicles.

Other oleaginous vehicles which may be employed herewith are, for example, mineral oils in the lubricating oil viscosity range, i.e. from about 50 S.S.U. at 100° F. to about 300 S.S.U. at 210° F. These mineral oils may be suitably solvent extracted, with phenol, furfural, B,B'-dichlorodiethylether (Chlorex), liquid $SO_2$, nitrobenzenes, etc. Synthetic lubricating oils resulting from polymerization of unsaturated hydrocarbons or other oleaginous materials within the lubricating oil viscosity range such as high molecular weight polyoxyalkylene compounds such as polyalkylene glycols and esters thereof, aliphatic diesters of dicarboxylic acids such as the butyl, hexyl, 2-ethylhexyl, decyl, lauryl, etc., esters of sebacic acid, adipic acid, azeleic acid, etc., are thickened by the ureido compounds to produce excellent greases. Polyfluoro derivatives of organic compounds, particularly hydrocarbons, and dibasic acid esters of $H(CF_2)_2CH_2CH$, in the lubricating oil viscosity range can be thickened. Other synthetic oils, such as esters of aliphatic carboxylic acids and polyhydric alcohol, e.g. trimethylolpropane pelargonate, pentaerythritol hexonate, can be used as suitable oil vehicles.

The following is illustrative of the preparation of lubricating greases in accordance with the present invention:

PREPARATION OF GREASE

Three grams of bitolylene diisocyanate were mixed with a large proportion of the total amount of a solvent extracted base petroleum oil to be used, and the mixture heated to about 150° F. to effect solution of the isocyanate in the oil. To the heated solution were added seven grams of dehydroabietyl amine and additional base oil in amount sufficient to give a total of 90 grams of said oil and the mixture heated to a temperature of 380° F. to 390° F. and maintained at said temperature until the mixture increased to the desired consistency. The grease product was then finished by passage through a colloid mill.

To illustrate the exceptional radiative resistance of the ureido-thickened greases, a series of tests is conducted by preparing several greases and measuring their physical properties, both before and after irradiation to a dosage of around $10^8$ roentgens of gamma irradiation from a cobalt-60 source under static conditions at about 70° F. The following inspections were made:

(1) Penetration—ASTM D1403–56T. A measure of grease hardness or consistency is obtained by measuring the distance a falling weighted ¼″ cone enters a cup of grease.

(2) Mechanical stability—The resistance of a grease to change upon physical working is measured by determining the ASTM penetration on a grease as obtained from the mill or homogenizer, and again after working 60 strokes in the ASTM D217–52T worker. The percentage change in penetration is taken as a quantitative indication of the mechanical stability.

(3) Leakage—A 10 gram grease sample in a 60-mesh screen cone is placed on a tared beaker in an oven at 212° F. Leakage is determined by weighing the amount of oil in the beaker after 24 hours testing.

(4) Roll stability—The mechanical stability of a grease while working under compressive load is determined by rolling a sample of the grease in a tube containing an eleven pound bar, in accordance with the test described in Inst. Spokesman, 6 (1943), page 2. The change in ASTM penetration before and after rolling is a measure of mechanical stability in rolling friction service under load.

*Example I*

In this example, a grease was prepared from dehydroabietyl amine and bitolylene diisocyanate as thickener and a solvent-extracted petroleum oil as base fluid. It had the following composition and properties:

| Grease composition | Identity | Weight Percent |
|---|---|---|
| Thickener | Dehydroabietyl amine-DTDI [1] | 7 |
| Base fluid | 500 S.S.U. petroleum oil | 91.7 |
| Oxidation inhibitors | {Dilauryl selenide | 1 |
|  | {Ortholeum 300 [2] | 0.3 |

| Grease properties | Before irradiation | Irradiated to 1.4 × 10⁸ R. | Change |
|---|---|---|---|
| Penetration, as made | 276 | 296 | +20 |
| Penetration, 60 strokes | 280 | 292 | +12 |
| Mechanical stability, percent | 1.5 | −1.4 | |
| Leakage | 1.5 | 2.0 | |
| Drop point, °F | 510 | 502 | −8 |
| Roll stability, hrs./pen | 0/288 | 0/307 | |
|  | 4/290 | 4/319 | |
|  | 22/292 | 21/333 | |
|  |  | 45/343 | |
|  |  | 117/337 | |
|  |  | 141/337 | |

[1] DTDI is bitolylene diisocyanate.
[2] Ortholeum 300 is a du Pont product consisting chiefly of aromatic amines.

*Example II*

In this example, a grease was prepared from dehydroabietyl amine and bitolylene diisocyanate as thickener and a solvent-extracted petroleum oil as base fluid. It had the following composition and properties:

| Grease composition | Identity | Weight Percent |
|---|---|---|
| Thickener | Dehydroabietyl amine-DTDI | 7 |
| Base fluid | 500 S.S.U. petroleum oil | 92.7 |
| Oxidation inhibitor | Ortholeum 300 | 0.3 |

| Grease properties | Before irradiation | Irradiated to 1.4 × 10⁸ R. | Change |
|---|---|---|---|
| Penetration, as made | 268 | 280 | +12 |
| Penetration, 60 strokes | 272 | 299 | +27 |
| Mechanical stability, percent | 1.5 | 0.7 | |
| Leakage | 1.5 | 1.0 | |
| Drop point, °F | 504 | 467 | −37 |
| Roll stability, hrs./pen | 0/280 | 0/307 | |
|  | 4/293 | 6/318 | |
|  | 21.5/327 | 30/330 | |
|  | 93.5/308 | 102/337 | |
|  | 117/308 | 126/338 | |

*Example III*

In this example, a grease was prepared using an alkylated aromatic material as base fluid. It had the following composition and properties:

| Grease composition | Identity | Weight Percent |
|---|---|---|
| Thickener | Dehydroabietyl amine-DTDI | 10 |
| Base fluid | Heavy alkymer bottoms [1] | 89 |
| Oxidation inhibitor | Dilauryl selenide | 1 |

| Grease properties | Before irradiation | Irradiated to 1.4 × 10⁸ R. | Change |
|---|---|---|---|
| Penetration, as made | 321 | 349 | +27 |
| Penetration, 60 strokes | 321 | 361 | +40 |
| Mechanical stability, percent | 0 | 3.2 | |
| Leakage | | 10 | |
| Drop point, °F | 530 | 520 | −10 |
| Roll stability, hrs./pen | | 0/336 | |
|  | | 4/336 | |
|  | | 21/368 | |
|  | | 45/379 | |
|  | | 117/400+ | |

[1] Heavy alkymer bottoms is a viscous bottoms material composed of polyalkyl benzenes and derived from the alkylation of benzene with propylene tetramer to make detergent alkylate.

*Example IV*

In this example, a grease was prepared having a composition generally similar to that of Example III, except that no oxidation inhibitor was used. It had the following composition and properties:

| Grease composition | Identity | Weight Percent |
|---|---|---|
| Thickener | Dehydroabietylamine-DTDI | 10 |
| Base fluid | Heavy alkymer bottoms | 90 |
| Oxidation inhibitor | None | |

| Grease properties | Before irradiation | Irradiated to 1.14 × 10⁸ R. | Change |
|---|---|---|---|
| Penetration, as made | 308 | 349 | +41 |
| Penetration, 60 strokes | 321 | 365 | +44 |
| Mechanical stability, percent | 4.3 | 4.6 | |
| Leakage | 0.08 | 0.86 | −9 |
| Drop point, °F | 530 | 521 | |
| Roll stability, hrs./pen | 0/321 | 0/355 | |
|  | 5/326 | 6.5/400+ | |
|  | 28/336 | | |
|  | 76/341 | | |
|  | 214/347 | | |

Properties of the greases of the several previous examples are compared below with reported properties of conventional greases upon irradiation, and it is observed that the present greases are markedly superior in all respects. It is particularly noted that the greases of the examples are notably more resistant to changes in penetration upon irradiation, both before and after working, then are the conventional soap greases.

Greases of the examples were also examined after irradiation by means of the electron microscope, and no detectable thickener damage was observed.

| Test | Grease | Mechanical stability, percent | Radiation ×10⁸ R. | Changes produced by radiation | | |
|---|---|---|---|---|---|---|
|  |  |  |  | Change in penetration, as made | Change in penetration, 60 strokes | Change in drop point, °F. |
| 1 | Example I | 1.5 | 1.4 | +20 | +12 | −8 |
| 2 | Example II | 1.5 | 1.4 | +12 | +27 | −37 |
| 3 | Example III | 0 | 1.14 | +27 | +40 | −10 |
| 4 | Example IV | 4.3 | 1.14 | +41 | +44 | −9 |
| 5 | 28% sodium stearate in 490 SSU pet. oil. | 18.1 | 1.2 | −10 | +62 | +6 |
| 6 | 18% calcium stearate in 600 SSU pet. oil. | 14.0 | 0.6 | +27 | +65 | −85 |

Percentages and parts given herein and in the appended claims are by weight, unless otherwise stated.

Although the present invention has been described with reference to specific embodiments thereof, the invention is not limited thereto, but includes within its scope such modifications and variations as come within the scope and spirit of the appended claims.

We claim:

1. The method of lubricating surfaces exposed to high energy ionizing radiation which comprises applying to said surfaces a lubricating grease composition comprising a normally liquid lubricant vehicle thickened with from about 2% to about 25%, by weight, of at least one ureido compound having the general formula

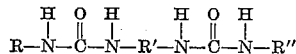

wherein R and R" are abietyl radicals selected from the group consisting of a dehydroabietyl radical, a dihydroabietyl radical, a tetrahydroabietyl radical and mixtures thereof, and R' is an organic radical selected from the group consisting of an alkylene radical of from 1 to about 30 carbon atoms, and an arylene radical.

2. The method of claim 1 in which the normally liquid lubricant vehicle is a mineral lubricating oil.

3. The method of claim 1 in which the normally liquid lubricant vehicle is an acyclic ester of an aliphatic dicarboxylic acid.

4. The method of claim 1 in which the normally liquid lubricant vehicle is an alkylated aromatic liquid.

5. The method of claim 1 wherein R' is an arylene radical.

6. The method of claim 5 wherein said arylene radical is a ditolylene radical.

7. The method of lubricating surfaces exposed to high energy ionizing radiation which comprises applying to said surfaces a lubricating grease composition comprising a normally liquid hydrocarbon lubricating oil thickened with from about 2% to about 25%, by weight, of a ureido compound having the general formula

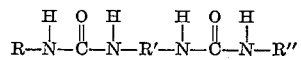

in which R and R" are abietyl radicals selected from the class consisting of a dehydroabietyl radical, a dihydroabietyl radical, a tetrahydroabietyl radical and mixtures thereof, and R' is a ditolylene radical.

References Cited in the file of this patent

UNITED STATES PATENTS

| | | |
|---|---|---|
| 2,520,901 | Benoit | Sept. 5, 1950 |
| 2,710,841 | Swakon et al. | June 14, 1955 |